(12) United States Patent
Liu

(10) Patent No.: US 9,701,333 B2
(45) Date of Patent: Jul. 11, 2017

(54) STROLLER

(71) Applicant: Unitron Enterprises Zhuhai Co., Ltd., Zhuhai (CN)

(72) Inventor: Xiuping Liu, Zhuhai (CN)

(73) Assignee: UNITRON ENTERPRISES ZHUHAI CO., LTD., Guangdong (CN)

( * ) Notice: Subject to any disclaimer, the term of this patent is extended or adjusted under 35 U.S.C. 154(b) by 82 days.

(21) Appl. No.: 14/439,129

(22) PCT Filed: May 15, 2014

(86) PCT No.: PCT/CN2014/077560
§ 371 (c)(1),
(2) Date: Apr. 28, 2015

(87) PCT Pub. No.: WO2014/201926
PCT Pub. Date: Dec. 24, 2014

(65) Prior Publication Data
US 2015/0307121 A1    Oct. 29, 2015

(30) Foreign Application Priority Data

Jun. 20, 2013   (CN) .......................... 2013 1 0247689

(51) Int. Cl.
*B62B 7/08*     (2006.01)
*B62B 7/10*     (2006.01)
(Continued)

(52) U.S. Cl.
CPC ............. *B62B 7/105* (2013.01); *B62B 7/062* (2013.01); *B62B 7/08* (2013.01); *B62B 7/142* (2013.01);
(Continued)

(58) Field of Classification Search
CPC  B62B 7/10; B62B 7/105; B62B 7/062; B62B 7/08; B62B 7/142; B62B 7/064; B62B 2205/20
See application file for complete search history.

(56) References Cited

U.S. PATENT DOCUMENTS 3,797,848 A * 3/1974 Burnham ................ B62B 7/062
                                                    280/644
4,191,397 A * 3/1980 Kassai ..................... B62B 7/062
                                                    280/647
(Continued)

FOREIGN PATENT DOCUMENTS

CN       201264630 Y     7/2009
CN       201313571 Y     9/2009
(Continued)

OTHER PUBLICATIONS

First Examination Report dated Feb. 18, 2016, New Zealand Patent Application 631433, Two (2) Pages.
(Continued)

*Primary Examiner* — Hau Phan
*Assistant Examiner* — Jacob Meyer

(57) ABSTRACT

A folding stroller having a frame that can be arranged in at least a first configuration and a second configuration, the frame including a handgrip fixedly connected to an upper joint, a lower joint pivotally connected to the upper joint, the lower joint being fixedly connected to a front tube, a rear joint pivotally connected to the lower joint, the rear joint being fixedly connected to a rear tube, and a joint connecting rod connected to the lower joint, the rear joint, and the upper joint, wherein a distance between the upper joint and the rear joint is larger than a predefined threshold while the frame is in the first configuration, while the frame is in the second
(Continued)

configuration, and while the frame is transitioning between the first configuration and the second configuration.

17 Claims, 16 Drawing Sheets

(51) Int. Cl.
- *B62B 9/00* (2006.01)
- *B62B 9/20* (2006.01)
- *B62B 7/14* (2006.01)
- *B62B 7/06* (2006.01)

(52) U.S. Cl.
CPC .............. *B62B 9/00* (2013.01); *B62B 9/20* (2013.01); *B62B 7/064* (2013.01); *B62B 2205/20* (2013.01)

(56) References Cited

U.S. PATENT DOCUMENTS

| | | | | | |
|---|---|---|---|---|---|
| 4,216,974 | A * | 8/1980 | Kassai | ................ | B62B 7/062 280/42 |
| 5,074,575 | A * | 12/1991 | Bigo | ................ | B62B 9/26 280/642 |
| 5,427,402 | A * | 6/1995 | Huang | ................ | B62B 7/08 280/642 |
| 6,086,086 | A * | 7/2000 | Hanson | ................ | A61G 5/00 280/642 |
| 6,102,431 | A * | 8/2000 | Sutherland | ................ | B62B 7/062 280/47.17 |
| 6,105,998 | A * | 8/2000 | Baechler | ................ | B62B 7/062 280/47.38 |
| 6,196,571 | B1 * | 3/2001 | Chen | ................ | B62B 7/08 280/647 |
| 7,077,420 | B1 * | 7/2006 | Santoski | ................ | B62B 7/062 280/639 |
| 7,237,795 | B2 * | 7/2007 | Wu | ................ | B62B 3/12 280/651 |
| 7,401,803 | B1 * | 7/2008 | Lai | ................ | B62B 7/08 280/47.38 |
| 7,632,035 | B2 * | 12/2009 | Cheng | ................ | B62B 7/008 280/642 |
| 7,798,500 | B2 * | 9/2010 | Den Boer | ................ | B62B 7/062 280/47.34 |
| 7,832,756 | B2 * | 11/2010 | Storm | ................ | B62B 7/062 280/642 |
| 8,092,111 | B2 | 1/2012 | Wu | | |
| 8,141,895 | B2 * | 3/2012 | Haut | ................ | B62B 7/08 280/642 |
| 8,205,907 | B2 * | 6/2012 | Chicca | ................ | B62B 7/062 280/642 |
| 8,210,563 | B2 * | 7/2012 | Dotsey | ................ | B62B 7/08 280/47.371 |
| 8,596,669 | B2 * | 12/2013 | Liao | ................ | B62B 7/08 280/47.38 |
| 8,696,016 | B2 * | 4/2014 | Homan | ................ | B62B 7/105 280/47.34 |
| 8,714,581 | B2 * | 5/2014 | Fritz | ................ | B62B 7/08 280/642 |
| 8,764,048 | B1 * | 7/2014 | Ahnert | ................ | B62B 9/104 280/47.4 |
| 8,827,283 | B2 * | 9/2014 | Homan | ................ | B62B 7/105 248/503.1 |
| 8,870,213 | B1 * | 10/2014 | Xu | ................ | B62B 7/08 280/642 |
| 8,985,616 | B1 * | 3/2015 | Chen | ................ | B62B 7/062 280/47.38 |
| 9,044,104 | B2 * | 6/2015 | Smith | ................ | A47D 1/02 |
| 9,050,993 | B2 * | 6/2015 | Pollack | ................ | B62B 9/12 |
| 9,242,665 | B2 * | 1/2016 | Offord | ................ | B62B 7/105 |
| 9,308,929 | B1 * | 4/2016 | Dowd | ................ | B62B 7/062 |
| 2007/0164538 | A1 * | 7/2007 | Yeh | ................ | B62B 7/062 280/642 |
| 2008/0061534 | A1 * | 3/2008 | Chen | ................ | B62B 7/08 280/647 |
| 2008/0079240 | A1 | 4/2008 | Yeh | | |
| 2009/0121455 | A1 * | 5/2009 | Kretschmer | ............ | B62B 7/062 280/642 |
| 2010/0127480 | A1 * | 5/2010 | Ahnert | ................ | B62B 7/08 280/647 |
| 2014/0167393 | A1 * | 6/2014 | Tsai | ................ | B62B 7/08 280/650 |
| 2014/0339793 | A1 * | 11/2014 | Xu | ................ | B62B 7/08 280/650 |
| 2015/0197268 | A1 * | 7/2015 | Dowd | ................ | B62B 7/08 280/650 |
| 2015/0344058 | A1 * | 12/2015 | Liu | ................ | E05D 11/1007 280/647 |

FOREIGN PATENT DOCUMENTS

| | | |
|---|---|---|
| CN | 201325470 Y | 10/2009 |
| CN | 101774395 A | 7/2010 |
| CN | 201545031 U | 8/2010 |
| CN | 203318472 U | 12/2013 |
| EP | 2221232 A2 | 8/2010 |
| EP | 2368784 A1 | 9/2011 |
| EP | 2420428 A1 * | 2/2012 |
| WO | 2007/099121 A1 | 9/2007 |
| WO | WO2015093999 A1 * | 6/2015 |

OTHER PUBLICATIONS

Supplementary European Search Report mailed Feb. 4, 2016 for European Patent Application No. 14813244.2 filed.

* cited by examiner

STROLLER

CROSS-REFERENCE TO RELATED APPLICATIONS

This is a U.S. national application filed under 35 U.S.C. §371 of International Application No. PCT/CN2014/077560, filed Jan. 27, 2013, which claims priority to Chinese National Application No. 201310247689.3, filed Jun. 20, 2013, the entire disclosures of which applications are expressly incorporated herein by reference.

FIELD OF THE DISCLOSURE

Embodiments of the present disclosure relate generally to the field of strollers. More specifically, the present disclosure relates to a stroller that mitigates the risk of a person's hands being nipped or sheared during folding and unfolding of the stroller.

BACKGROUND OF THE DISCLOSURE

Conventional strollers often place children and adult users at risk of nipping or shearing their hands during the process of folding and unfolding the frame of a stroller. This is at least partially due to conventional strollers creating "scissor gaps" between components during folding and unfolding. A stroller which avoids or reduces this risk would therefore be an improvement. Additionally, safety requirements for strollers in the global marketplace have become increasingly stringent. Many recently-enacted requirements prohibit strollers which nip or shear hands while folding or unfolding the frame.

FIG. 1 illustrates a foldable stroller according to the prior art. Such a stroller is foldable by turning a handgrip 104 toward a front tube 103. The stroller has an elongated folding joint 105 with an upper pivot point 101 at the upper end and a lower pivot point 106 at the lower end. A rear tube 107 is connected with folding joint 105 at lower pivot point 106. The front tube 103 is connected with folding joint 105 at upper pivot point 101. The handgrip 104 is not attached to any pivot point, but is connected with the folding joint 105. The opposite ends of a connecting rod 108 respectively pivot, causing the front tube and the rear tube to come together. When the handgrip 104 turns and rotates toward the front tube 103 to fold the frame, the folding joint 105 rotates about the upper pivot point 101 where it is connected to the front tube 103. At the same time, the lower end of the folding joint 105 rotates about the lower pivot point 106, where it is connected to the rear tube 107, and the rear tube 107 tilts up. The connecting rod 108 pulls the rear tube 107 to rotate about the lower pivot point 106 at the lower end of the folding joint 105, so that the rear tube 107 approaches the front tube 103, synchronously achieving the function of folding the frame in such a manner that the handgrip 104 approaches the front tube, and the rear tube 107 approaches the front tube 103.

The stroller shown in FIG. 1 creates considerable hand nipping and shearing gaps during folding and unfolding of the frame. These gaps cause safety risks to children and adult users, especially due to a large "scissor gap" between the lower end of the folding joint and the front tube when the frame is unfolded, and additional "scissor gaps" between the connecting rod and the front and rear tubes while the connecting rod approaches the front tube and the rear tube. Thus, there is a need for a stroller which addresses these safety issues.

SUMMARY

In view of the above, at least one technical problem to be solved by the present disclosure is providing a folding stroller which can be folded while avoiding the sort of dangerous "scissor gaps" which can nip or shear a person's hands. The following is a simplified summary in order to provide a basic understanding of some novel embodiments described herein. This summary is not an extensive overview and is not intended to identify key/critical elements or to delineate the scope thereof. The sole purpose of this summary is to present some concepts in a simplified form as a prelude to the more detailed description that is presented below.

An exemplary embodiment of folding stroller in accordance with the present disclosure may include a frame that can be arranged in at least a first configuration and a second configuration, the frame including a handgrip fixedly connected to an upper joint, a lower joint pivotally connected to the upper joint, the lower joint being fixedly connected to a front tube, a rear joint pivotally connected to the lower joint, the rear joint being fixedly connected to a rear tube, and a joint connecting rod connected to the lower joint, the rear joint, and the upper joint, wherein a distance between the upper joint and the rear joint is larger than a predefined threshold while the frame is in the first configuration, while the frame is in the second configuration, and while the frame is transitioning between the first configuration and the second configuration.

Another exemplary embodiment of a folding stroller in accordance with the present disclosure may include a frame that is foldable between a folded configuration and an unfolded configuration, the frame including a handgrip, a front tube, a rear tube and a joint assembly, the joint assembly including an upper joint, a rear joint, a lower joint and a joint connecting rod, an upper end of the upper joint being fixedly connected with the handgrip, and the upper joint being provided with a first pivot point and a second pivot point, a lower end of the rear joint being fixedly connected with the rear tube, and the rear joint being provided with a third pivot point and a fourth pivot point, the lower joint being fixedly connected with the front tube, and the lower joint being provided with a fifth pivot point and a sixth pivot point, a first pivot shaft passing through the fifth pivot point and the first pivot point, the first pivot shaft pivotally connecting the lower joint with the upper joint, a second pivot shaft passing through the sixth pivot point and the fourth pivot point, the second pivot shaft pivotally connecting the lower joint with the rear joint, wherein the opposite ends of the joint connecting rod are configured to be pivoted on the second pivot point and the third pivot point respectively, wherein, while the frame transitions between the folded configuration and unfolded configuration, the handgrip causes the upper joint to rotate about the first pivot shaft, and the joint connecting rod is able to cause the rear joint and the rear tube to rotate about the second pivot shaft causing the rear tube to approach or move away from the front tube.

BRIEF DESCRIPTION OF THE DRAWINGS

By way of example, various embodiments of the disclosed device will now be described, with reference to the accompanying drawings, in which.

DETAILED DESCRIPTION

Referring to FIGS. 2-21, various embodiments of the present disclosure are described in detail.

Figure 1:
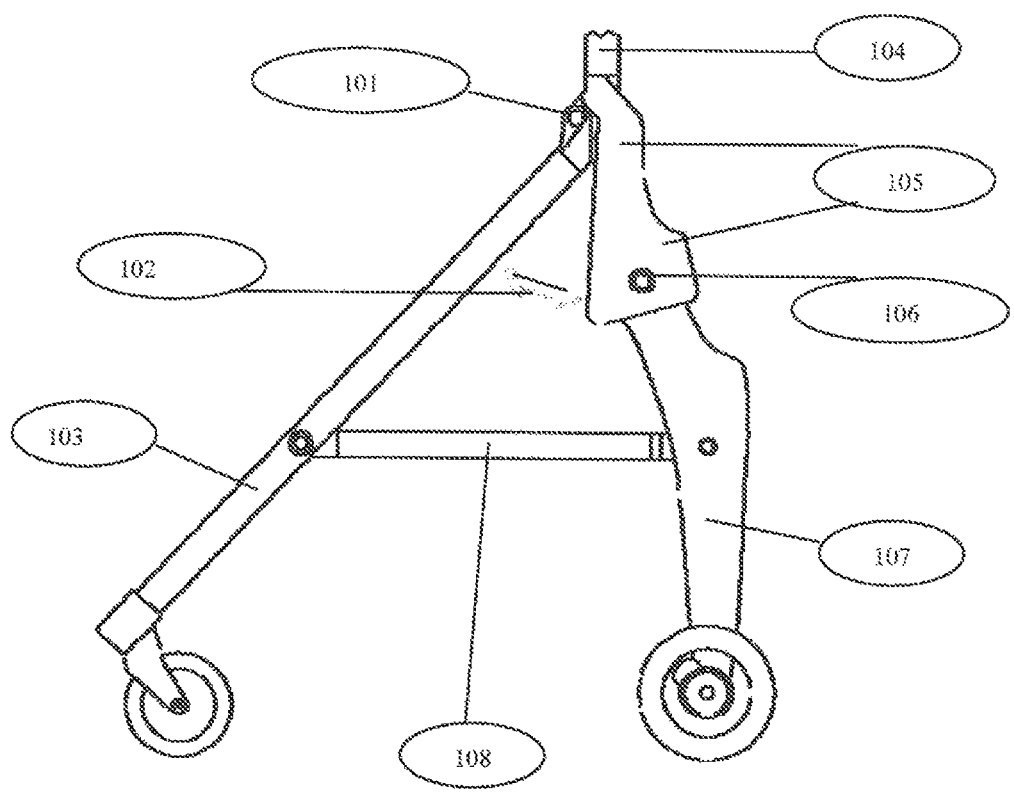
FIG. 1 is a schematic diagram illustrating a stroller according to the prior art.
Figure 2:
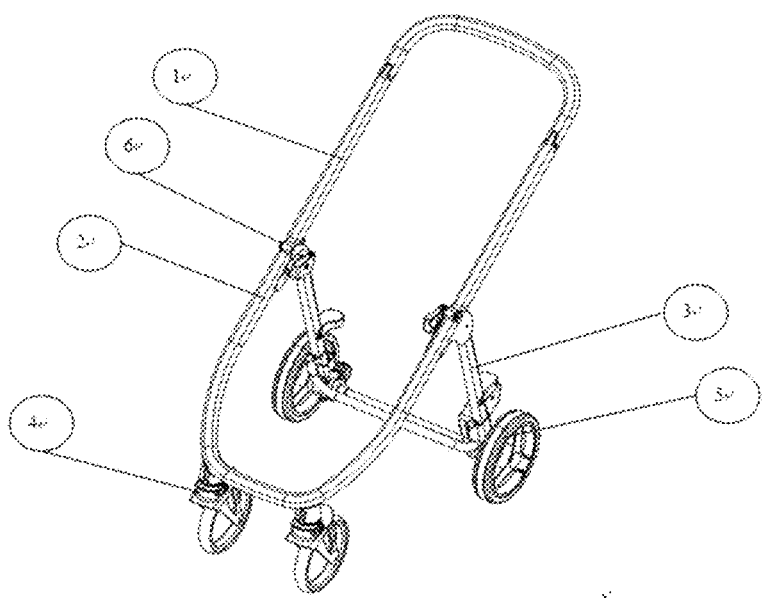
FIG. 2 is a front view illustrating a stroller frame according to an embodiment of a stroller of the present disclosure.

Referring to FIG. 2, a stroller is shown including a frame that can be arranged in two configurations: an unfolded configuration and a folded configuration. In FIG. 2, a front wheel set 4 is arranged at the front lower part of the frame, and a rear wheel set 5 is arranged at the rear lower part of the frame. Each wheel set 4, 5 includes a pair of wheels arranged symmetrically. The frame includes a pair of locking mechanisms arranged symmetrically for locking the frame in an unfolded position.

Figure 3:
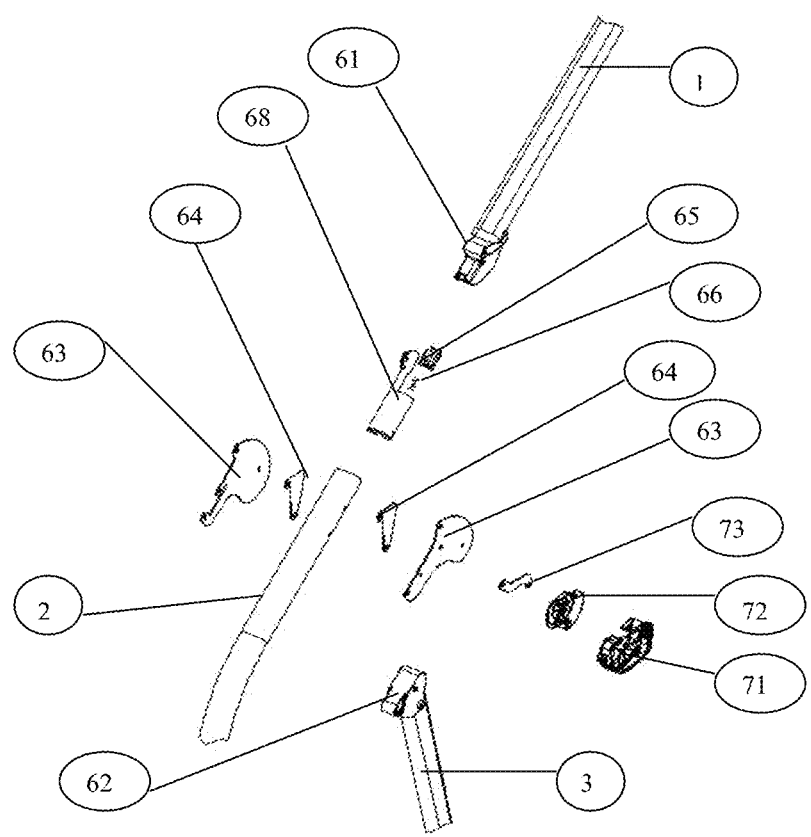
FIG. 3 is an exploded view illustrating a folding joint assembly according to an embodiment of the present disclosure.
Figure 4:
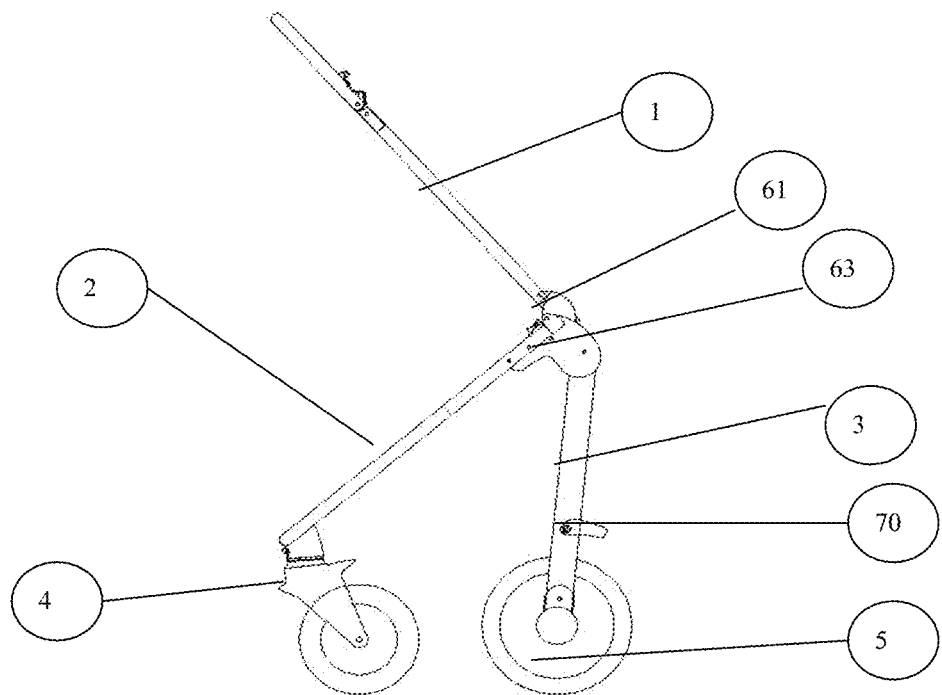
FIG. 4 is a side view illustrating a process of folding the frame shown in FIG. 2 by turning a handgrip forward according to an embodiment of the present disclosure.
Figure 5:
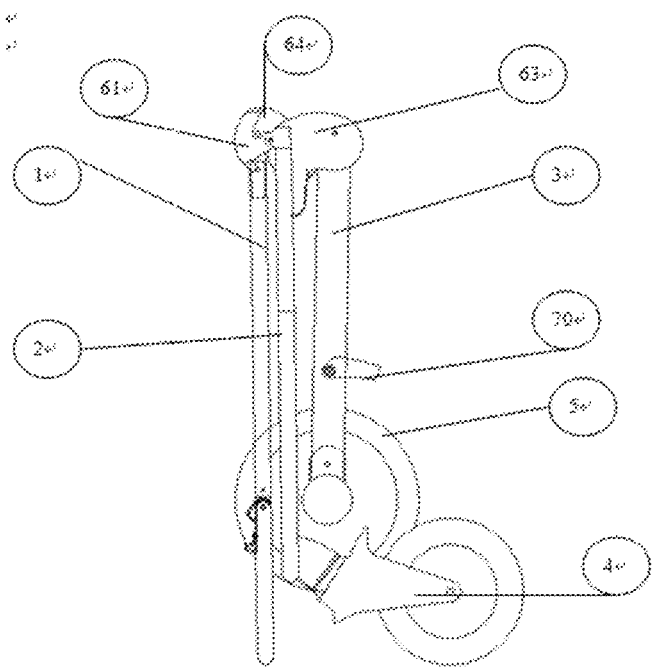
FIG. 5 is a side view illustrating the stroller shown in FIG. 2 with the handgrip turned forward to fold the frame to close according to an embodiment of the present disclosure.
Figure 6:
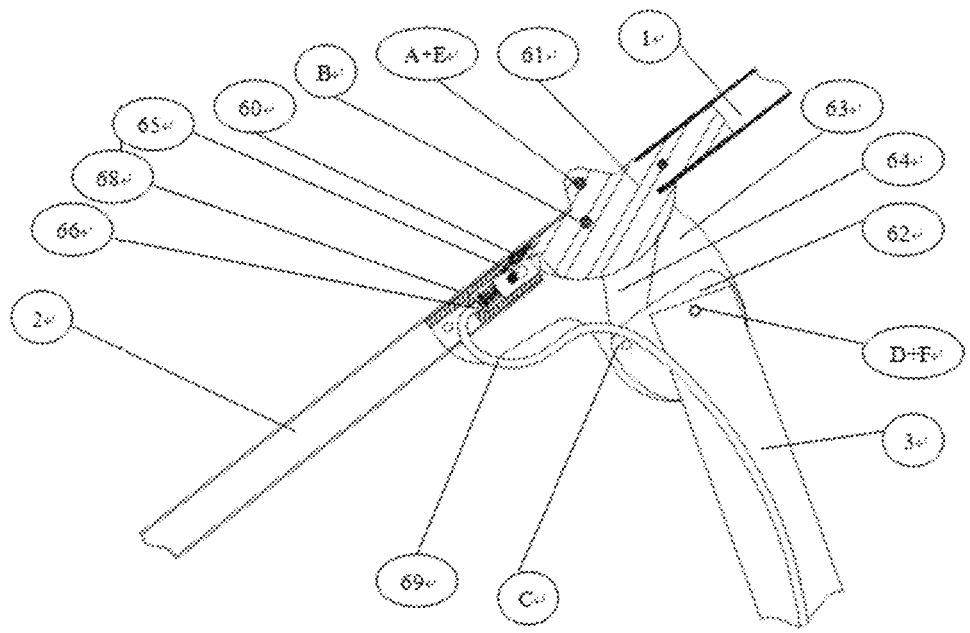
FIG. 6 is a sectional schematic view wherein an upper joint of the stroller shown in FIG. 2 is lifting up a locking pin blocker and is blocked by a locking pin when the frame is unfolded according to an embodiment of the present disclosure.
Figure 7:
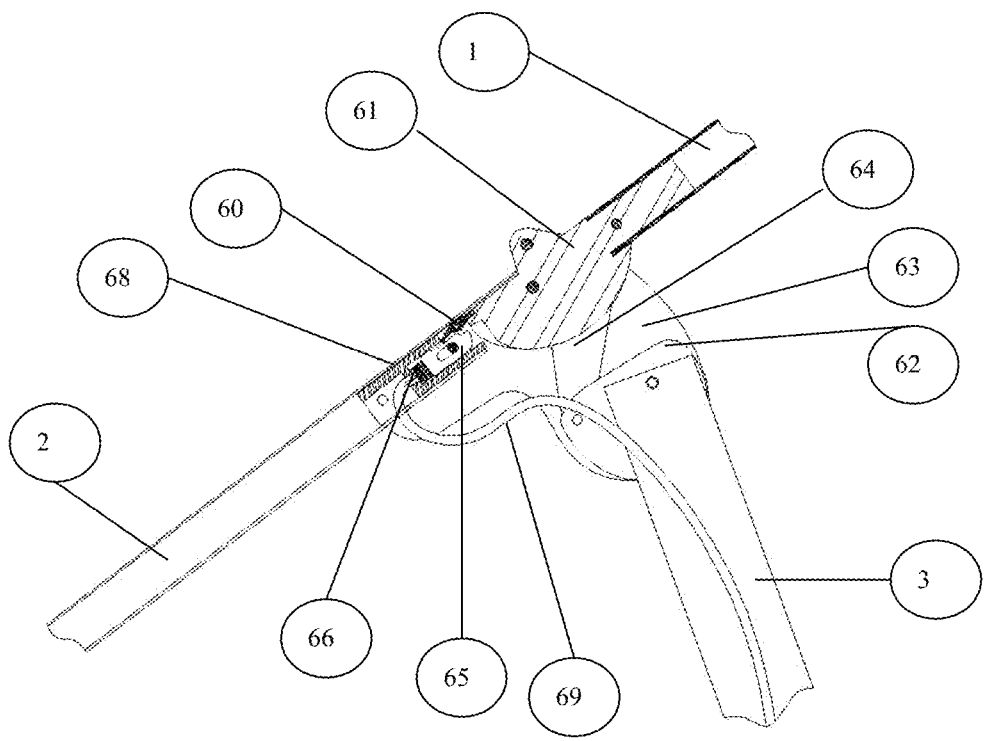
FIG. 7 is a sectional schematic view wherein a traction piece of the stroller shown in FIG. 2 is pulled to release the locking pin to block the upper joint according to an embodiment of the present disclosure.
Figure 8:
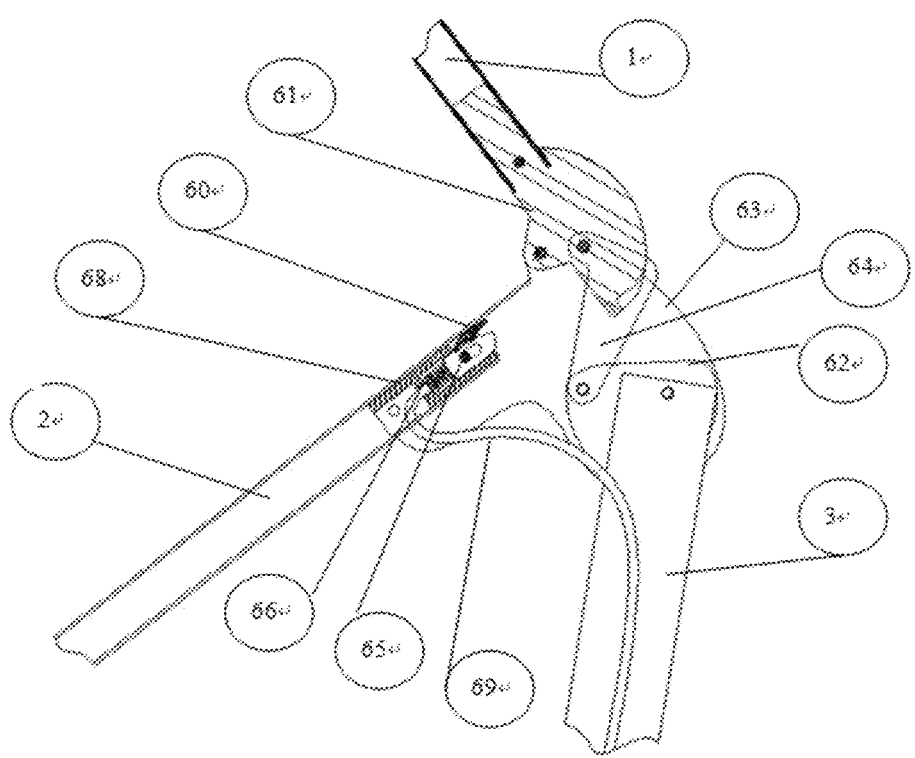
FIG. 8 is a sectional view wherein the handgrip of the stroller shown in FIG. 2 is turned forward so that the upper joint releases the locking pin blocker and the locking pin blocker releases the locking pin according to an embodiment of the present disclosure.
Figure 9:
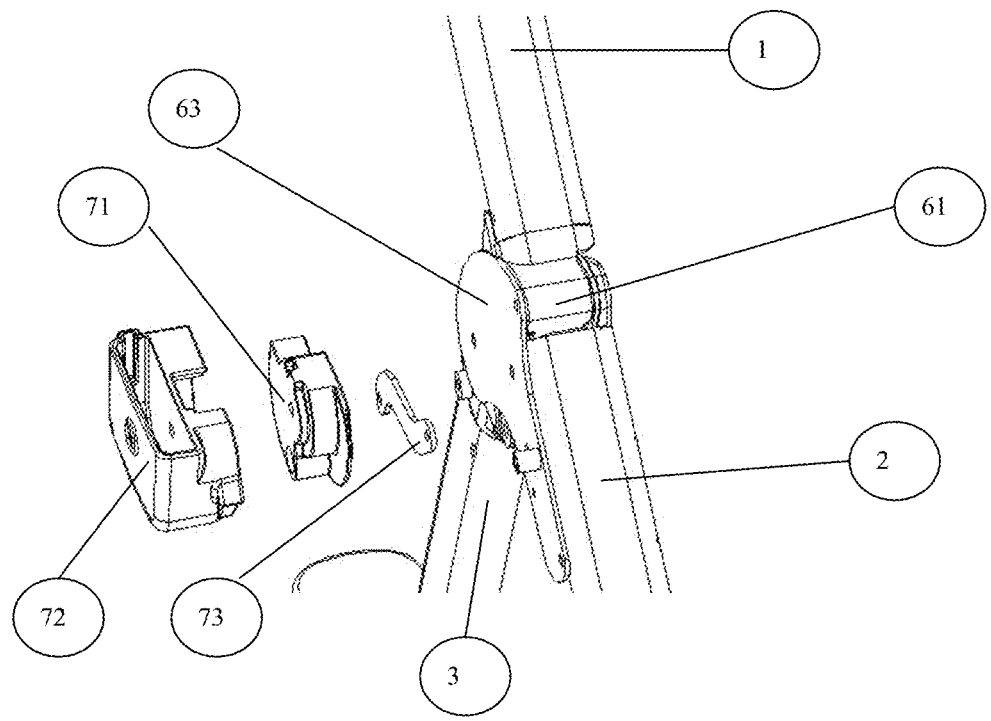
FIG. 9 is an exploded view of a seat support assembly of the stroller shown in FIG. 2 according to an embodiment of the present disclosure.
Figure 10:
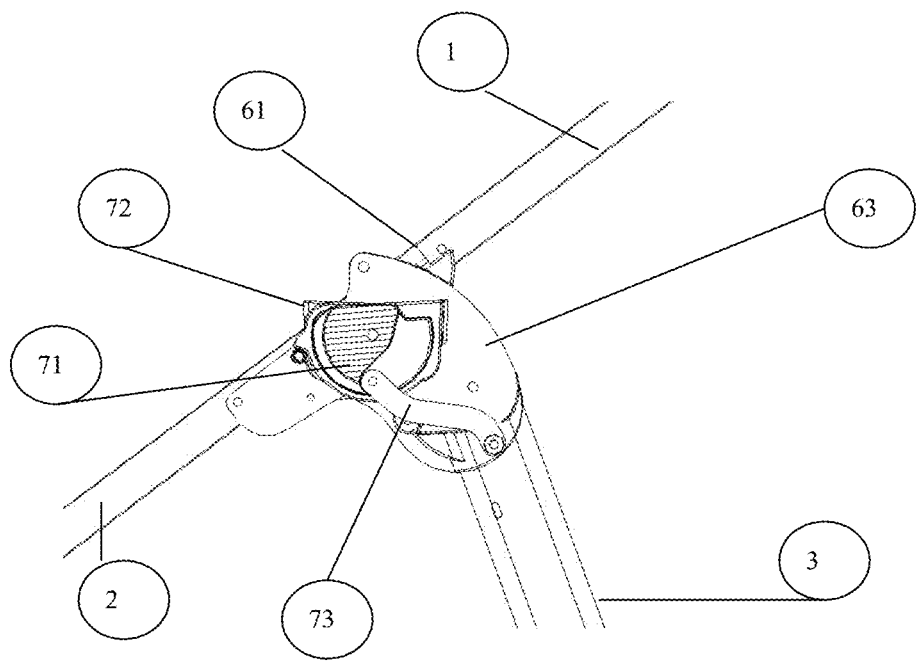
FIG. 10 is a sectional view of the seat support assembly the stroller shown in FIG. 9.
Figure 11:
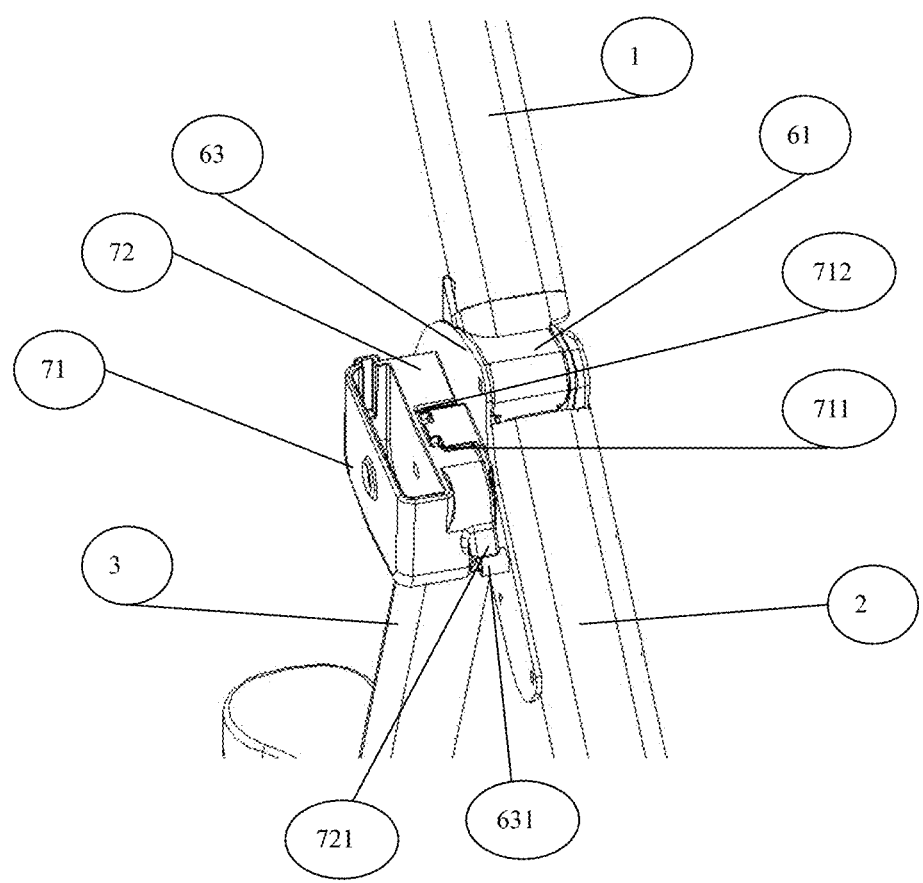
FIG. 11 is a schematic view of the seat support assembly the stroller shown in FIG. 9 wherein a support point of a front tube supports a reversing seat mount when the frame is fully unfolded according to an embodiment of the present disclosure.
Figure 12:
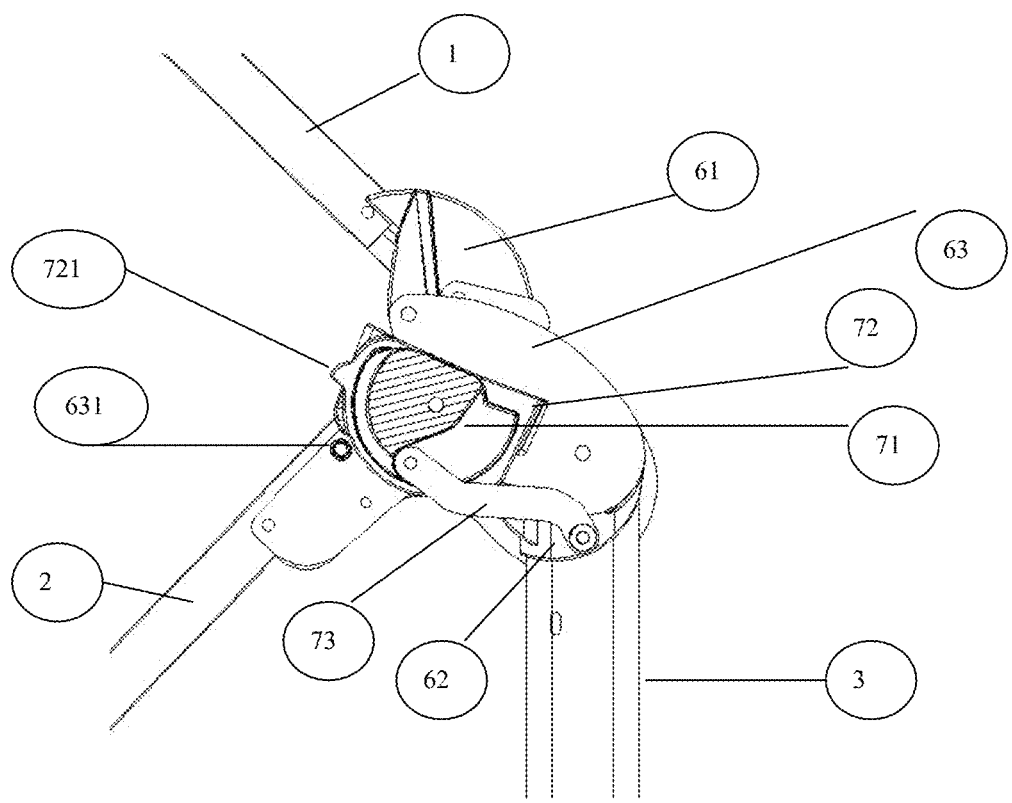
FIGS. 12, 13 and 14 are schematic views of a process wherein the handgrip of the stroller shown in FIG. 2 is turned forward to drive a rear tube to cause a mount support base to rotate and release the reversing seat mount according to an embodiment of the present disclosure.
Figure 13:
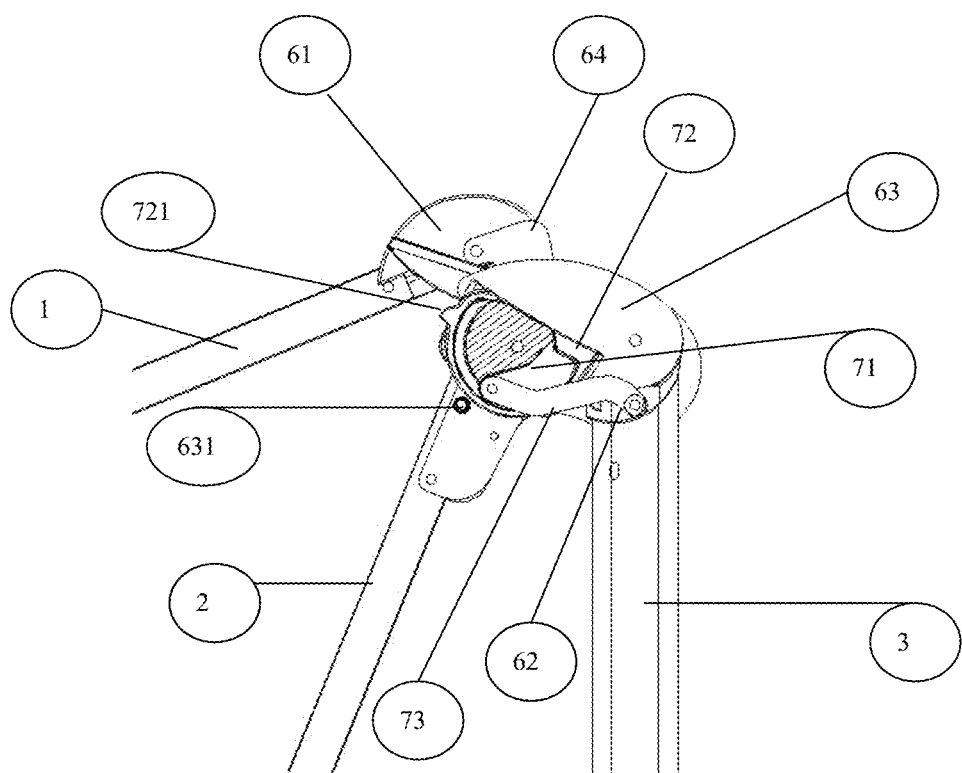
Figure 14:
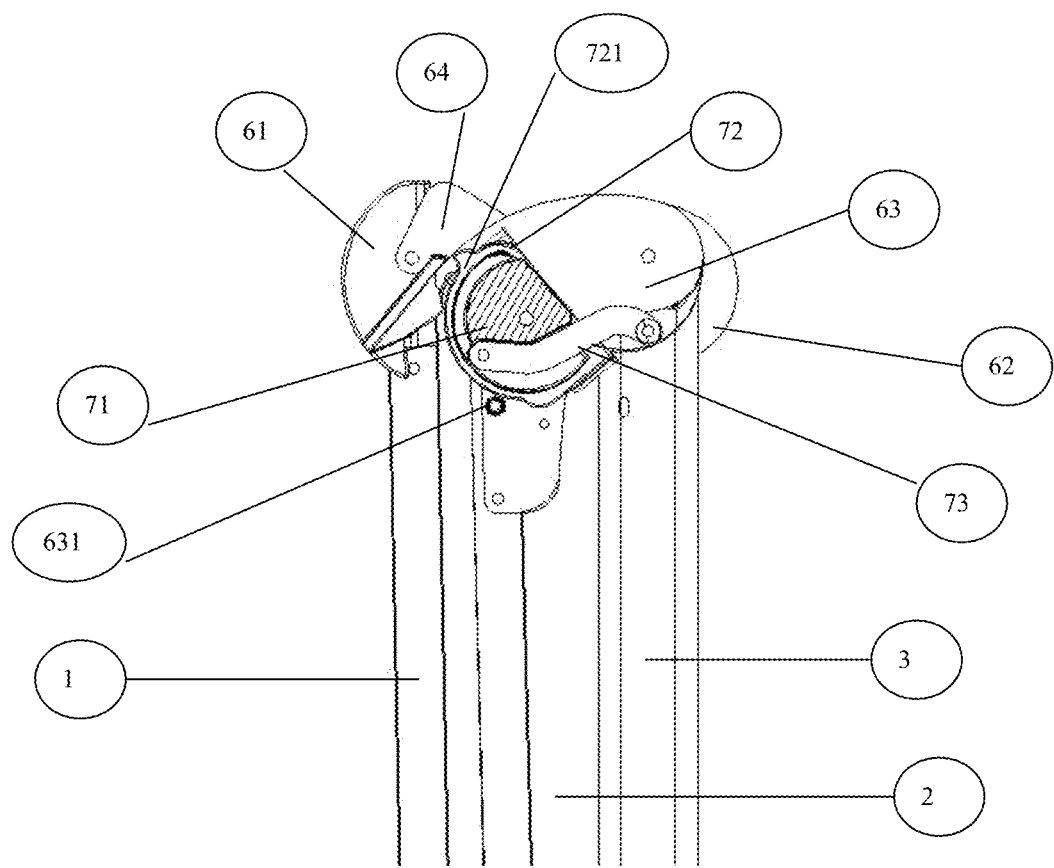
Figure 15:
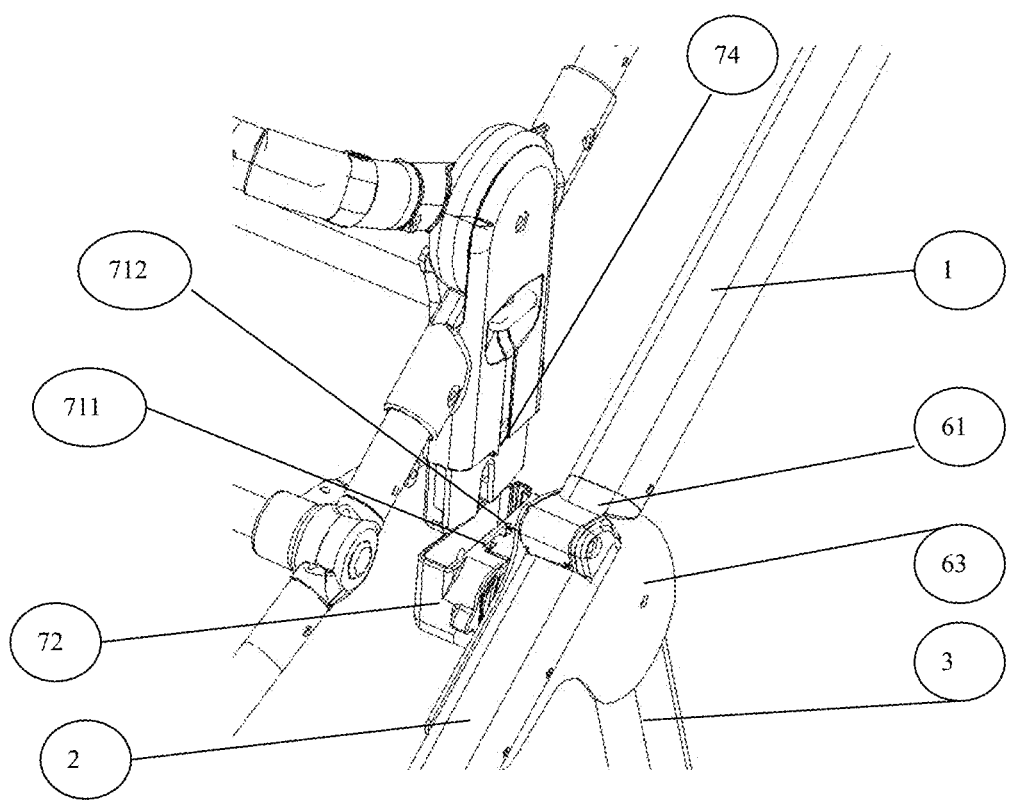
FIG. 15 is a schematic view wherein a reversing seat clamping pin of the stroller shown in FIG. 2 is inserted into the reversing seat mount toward the front tube according to an embodiment of the present disclosure.
Figure 16:
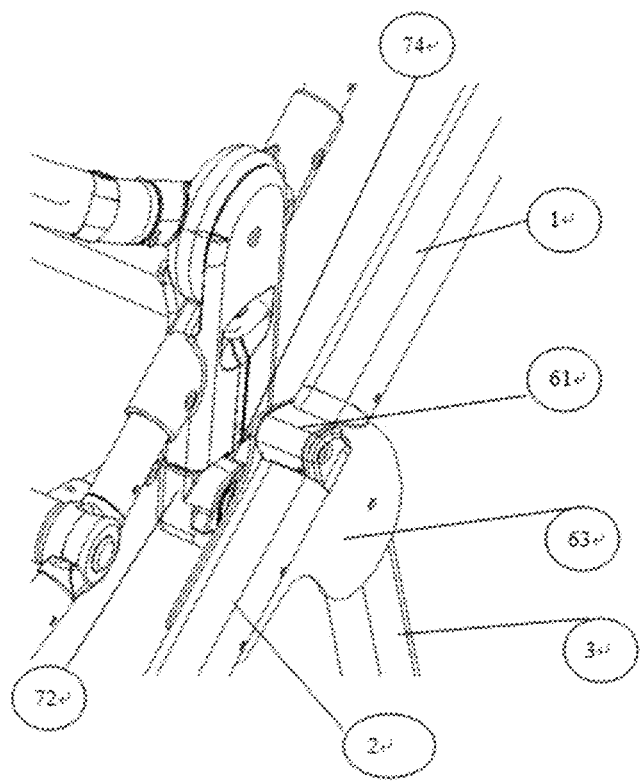
FIG. 16 is a schematic view wherein a clamping pin positioning post of the stroller shown in FIG. 2 is inserted into an open positioning hole after the reversing seat is inserted into the reversing seat mount by a clamping pin toward the front tube according to an embodiment of the present disclosure.

As shown in FIGS. 3, 4 and 5, the frame includes a handgrip 1, a front tube 2, and a rear tube 3. The frame also includes an upper joint 61, a rear joint 62, a lower joint 63 and a joint connecting rod 64.

The upper joint 61 is fixedly connected with the handgrip 1. The connection may be a threaded connection, buckled connection, or another connection known to those in the art. The upper joint 61 is provided with a first pivot point A and a second pivot point B. The rear joint 62 is fixedly connected with the rear tube 3. The rear joint 62 is provided with a third pivot point C and a fourth pivot point D. The lower joint 63 is fixedly connected with the front tube 2, and the lower joint 63 is provided with a fifth pivot point E and a sixth pivot point F.

A first pivot shaft passes through the fifth pivot point E and the first pivot point A. The first pivot shaft pivotally connects the lower joint 63 with the upper joint 61. A second pivot shaft passes through the sixth pivot point F and the fourth pivot point D. The second pivot shaft pivotally connects the lower joint 63 with the rear joint 62. One end of the joint connecting rod 64 can pivot on the second pivot point B, and the opposite end of the joint connecting rod 64 can pivot to the third pivot point C.

During the process of folding or unfolding the frame, the handgrip 1 causes the upper joint 61 to rotate about the first pivot shaft. Also, the joint connecting rod 64 causes the rear joint 62 and the rear tube 3 to rotate about the second pivot shaft. As a result, the rear tube 3 approaches or moves away from the front tube 2.

When the handgrip 1 is rotated toward the front tube 2 to fold the frame, the upper joint 61 (fixedly connected with the handgrip 1) rotates about the pivot point A of the upper joint, and at the same time the rear joint 62 and the rear tube 3 are driven by the joint connecting rod 64 to rotate about the pivot point D of the rear joint 62. Also, this causes the rear tube 3 to approach the front tube 2. During the process of unfolding the frame, the movement is reversed. This process allows folding and unfolding without dangerous scissor gaps, and therefore improves the safety of the stroller.

According to an embodiment of the present disclosure, the distance between the pivot point C and the pivot point D of the rear joint 62 is relatively large. The distance between the upper joint 61 and the rear joint 62 is kept larger than the safety gap threshold set forth in stroller safety standards known to those in the art. These safety standards may be national or international standards. This distance continues to be larger than the safety gap threshold even after the following: the pivot point A of the upper joint 61 is movably pivoted on the pivot point E of the lower joint 63, the pivot point B of the upper joint 61 is movably pivoted on the pivot point C of the rear joint 62, and the pivot point F of the lower joint 63 is movably pivoted on the pivot point D of the rear joint 62.

The joint connecting rod 64 that connects the pivot point B of the upper joint 61 and the pivot point C of the rear joint 62 is closely attached to side surfaces of the lower joint 63 and the upper joint 61. The surfaces of the lower joint 63, the upper joint 61 and the rear joint 62 are all shown as being arc-shaped. Making these joints arc-shaped may provide a safety improvement because doing so avoids the use of corners which may poke or scratch a child or adult user's hand.

The lower joint 63, the upper joint 61 and the rear joint 62 all have arc-shaped edges. This may provide a safety benefit because arc-shaped edges may be less likely to shear a user's hand than pointy edges. There is no dangerous hand-nipping gap between the folding joint assemblies during folding or unfolding.

According to an embodiment of the present disclosure, the folding joint assemblies are designed symmetrically at the left and right sides. The lower joint 63 and the joint connecting rod 64 of the folding joint assembly at each side are used symmetrically. The folding joint assemblies can made of high-strength plastic parts, or can be made of steel or aluminum alloy sheet metal parts, or other materials known in the art.

According to an embodiment of the present disclosure, no connecting rod is included between the front tube 2 and the rear tube 3. This helps avoid the risk of shearing and nipping hands during folding and unfolding.

According to an embodiment of the present disclosure, the lower part of the upper joint 61 is arc-shaped, and an arc-shaped blocking component is arranged at the lower part of the upper joint 61. The width of the arc-shaped blocking component is larger than that of the arc-shaped edge of the lower joint 63. During rotation of the upper joint 61 toward the rear tube 3 about the first pivot shaft, the surface of the arc-shaped edge of the lower joint 63 is in contact with the surface of the arc-shaped blocking component, thereby keeping the handgrip 1 restricted in a fixed position.

When the handgrip 1 is rotated toward the front tube to fold the frame, the upper joint fixedly connected with the handgrip rotates about the pivot point A of the upper joint. At the same time, the rear joint and the rear tube are driven by the joint connecting rod 64 to rotate about the pivot point D of the rear joint, and the rear tube is caused to approach the front tube. To unfold the frame, the movement is reversed. Dangerous hand-nipping gaps are avoided during both folding and unfolding of the frame, thereby increasing user safety.

The joint connecting rod 64 that connects the pivot point of the upper joint 2 and the pivot point of the rear joint 1 is closely attached to side surfaces of the lower joint and the upper joint. The surfaces of the lower joint, the upper joint and the rear joint, corresponding to each other, are all arc-shaped. There is no dangerous hand-nipping gap between the upper joint, the lower joint and the rear joint during folding or unfolding of the frame. A connecting rod is not necessary between the front tube and the rear tube, thereby avoiding the risk of shearing and nipping hands during folding and unfolding of the frame.

As shown in FIGS. 6, 7, 8 and 21, the frame locking mechanism includes a locking pin 65, a first elastic element 66, a second elastic element 67, a front tube plug 68, a traction piece 69, an unlocking pedal 70 and a locking pin blocker 60.

The front tube plug 68 is arranged in the front tube 2, opposite the lower end of the upper joint 61. A guide slot is arranged at the upper part of the front tube plug 68, and the locking pin 65 is arranged in the guide slot. The first elastic element 66 is arranged between the bottom of the guide slot and the locking pin 65.

The lower end of the locking pin 65 is fixedly connected with one end of the traction piece 69. Another end of the traction piece 69 passes through a through hole arranged at the bottom of the guide slot and the rear tube 3, and is fixedly connected with the unlocking pedal 70, which is pivoted on the rear tube 3.

A notch is arranged at the upper end of the front tube plug 68, and the locking pin blocker 60 is mounted in the notch. The upper end of the locking pin blocker 60 is arranged to be opposite the lower end of the upper joint 61. A projecting first blocking part is arranged at the lower end of the upper joint 61.

The middle segment of the locking pin blocker 60 and the second elastic element 67 are movably pivotable on the front tube plug 68 by a third pivot shaft. One end of the second elastic element 67 is fixedly connected to the locking pin blocker 60.

A projecting block portion is arranged at the upper part of the middle segment of the locking pin 65, and a first escape groove and a second escape groove are arranged on opposite sides of the projecting block portion, wherein the second escape groove is closer to the first elastic piece 66 than the first escape groove.

The upper end of the locking pin 65 is an arc-shaped bevel, and is provided with a second blocking part matched with the first blocking part.

During unfolding of the frame, the first blocking part is in contact with the arc-shaped bevel at the upper end of the locking pin 65, and compresses the first elastic piece 66. After the first blocking part passes the arc-shaped bevel at the upper end of the locking pin 65, the first blocking part lifts up the upper end of the locking pin blocker 60, and the locking pin blocker 60 overcomes elastic force of the second elastic element 67 and rotates about the third pivot shaft. Accordingly, the lower end of the locking pin blocker 60 approaches the locking pin 65.

When the frame is fully unfolded, the locking pin 65 projects outward under the elastic action of the first elastic piece 66 and contacts the clamping surface at the lower end of the upper joint 61. The locking pin clamps the first blocking part between the upper end of the locking pin blocker 60 and the second blocking part. The lower end of the locking pin blocker 60 falls into the second escape groove of the locking pin 65. The locking pin 65 blocks the upper joint 61 so that it cannot rotate upwards about the pivot point with the lower joint 63. Specifically, upward rotation of the upper joint 61 is restricted by the clamping surface of the locking pin 65, and at the same time downward rotation of the upper joint 61 is blocked by the wider arc-shaped blocking part, thus locking the frame.

To fold the frame, the traction piece 69 is pulled to compress the first elastic piece 66, so that the locking pin 65 retracts into the guide slot. After traction piece 69 is pulled to overcome frictional resistance between the projecting block portion of the locking pin 65 and the lower end of the locking pin blocker 60, the lower end of the locking pin blocker 60 falls into the first escape groove at one side of the projecting block portion of the locking pin 65, thereby restricting the locking pin 65 from projecting outwards. At the same time, the second blocking portion is separated from the first blocking portion, so that the upper joint 61 enters an unblocked rotatable configuration. However, since the upper joint 61 is not rotated, the lower end of the upper joint 61 still abuts against the upper end of the locking pin blocker 60, so that the lower end of the locking pin blocker 60 continues blocking the projecting block portion of the locking pin 65. The upper joint 61 is rotated so that the upper joint 61 releases blocking of the upper end of the locking pin blocker 60, and the locking pin blocker 60 rotates about the third pivot shaft under the elastic action of the second elastic element 67, so that the lower end of the locking pin blocker 60 moves away from the projecting block portion, and the locking pin 65 is released. When locking pin 65 is released, it springs out under the action of the first elastic element 66, and thereby returns to a set position. The second elastic element 67 can be, for example, a torsional spring or an elastic sheet.

According to an embodiment of the present disclosure, a slotted hole is formed in the middle of the middle segment of the locking pin 65, and a fourth pivot shaft passes through the slotted hole and is fixedly connected with the front tube plug 68, wherein the retracting part of the locking pin 65 is the length of the slotted hole.

As shown in FIGS. 9-20, a seat support assembly includes a reversing seat mount 72, a mount support base 71 and a mount support connecting rod 73. The reversing seat mount 72 and the mount support base 71 can pivot on the lower joint 63 via the third pivot shaft. The mount support base 71 is arranged between the reversing seat mount 72 and the lower joint 63. The reversing seat mount 72 and the mount support base 71 are both rotatable about the third pivot shaft.

The opposite ends of the mount support connecting rod 73 can pivot on the mount support base 71 and the rear tube 3 respectively. A support part 721 is arranged on a side surface of the reversing seat mount 72, and the support part 721 is matched with a support point 631 arranged on the front tube 2.

In a fully unfolded configuration of the frame, the support point 631 supports the support part 721, so that the reversing seat mount 72 is not rotatable. The mount support base 71 is provided with a first positioning hole 711 and a second positioning hole 712. Additionally, a clamping pin of a reversing seat is provided with a positioning post 74 matched with the first positioning hole 711 and the second positioning hole 712.

The second positioning hole 712 is a closed positioning hole, and the first positioning hole 711 is an open hole of which the side wall is open. The open hole and the reversing seat mount 72 are combined to form a closed positioning hole.

When the reversing seat is inserted into the reversing seat mount 72 toward the rear tube, and the positioning post 74 is clamped into the second positioning hole 712 during folding of the frame, the rear tube 3 drives the mount support base 71 with the mount support connecting rod 73 to rotate about the pivot point with the lower joint 63. Additionally, the second positioning hole 712 locks the positioning post 74, so that the clamping pin of the reversing seat turns to the direction of the rear tube 3 along with the mount support base 71.

When the reversing seat is inserted into the reversing seat mount 72 toward the front tube, and the positioning post 74 is clamped into the first positioning hole 711 during folding of the frame, the rear tube 3 approaches the front tube 2, and the rear tube 3 drives the mount support base 71 by means of the mount support connecting rod 73 to rotate about the pivot point with the lower joint 63, so that the mount support base 71 drives the reversing seat mount 72 to rotate toward the rear tube 3. Additionally, the support point 631 of the front tube 2 moves away from the support part 721 of the reversing seat mount 72. Because the first positioning hole 711 is an open hole of which the side wall is open, and the reversing seat mount 72 rotates, the reversing seat mount 72 is movable relative to the reversing seat, which approaches the front tube due to its own weight.

Figure 17:
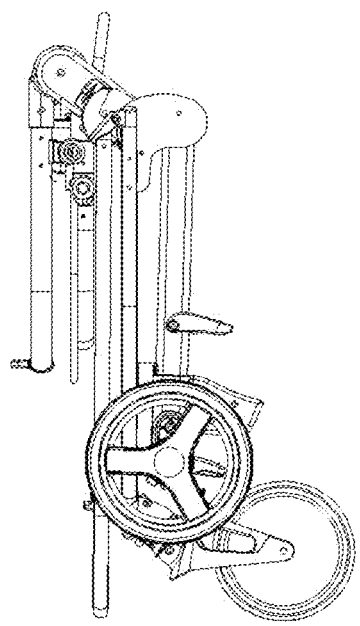
FIG. 17 is a schematic view wherein the clamping pin positioning post shown in FIG. 16 is inserted into the open positioning hole after the reversing seat clamping pin is inserted into the reversing seat mount toward the front tube according to an embodiment of the present disclosure.
Figure 18:
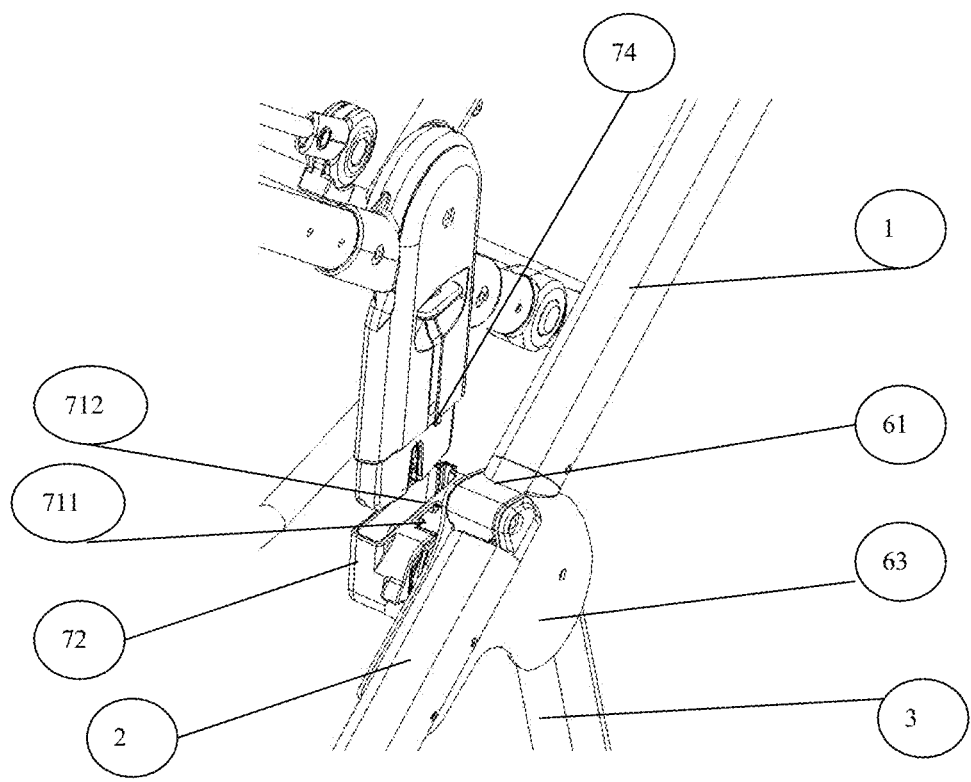
FIG. 18 is a schematic view wherein the reversing seat is inserted into the reversing seat mount by a clamping pin toward a rear tube according to an embodiment of the present disclosure.
Figure 19:
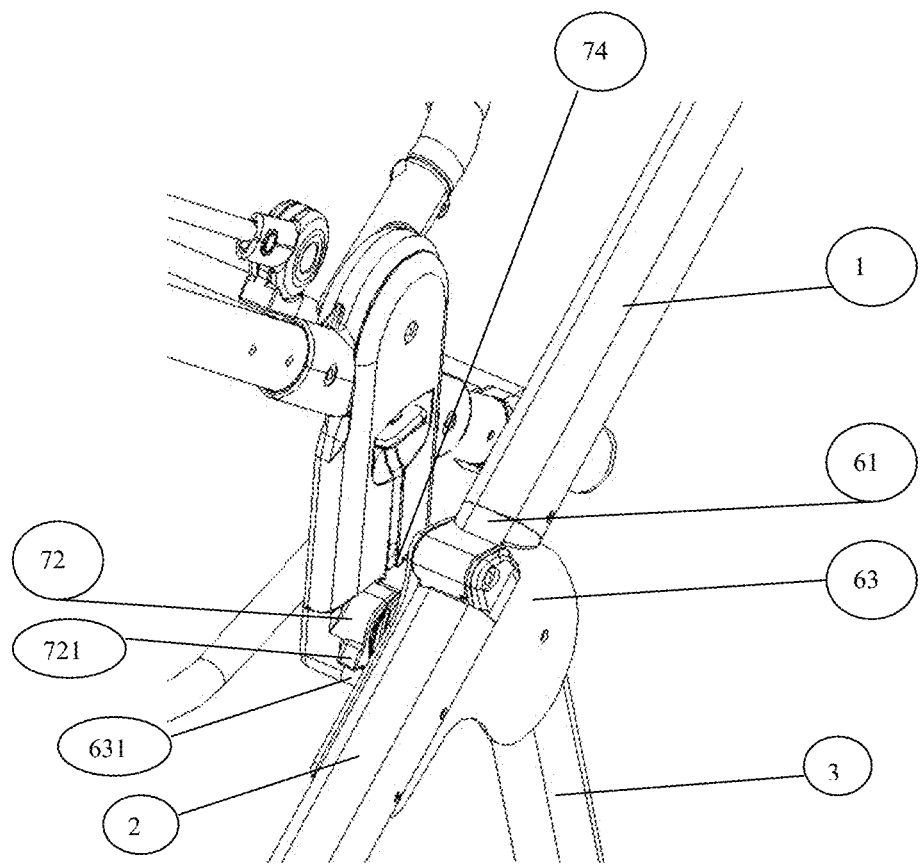
FIG. 19 is a schematic view wherein the clamping pin positioning post is inserted into a closed positioning hole after the reversing seat is inserted into the reversing seat mount by a clamping pin toward the rear tube according to an embodiment of the present disclosure.
Figure 20:
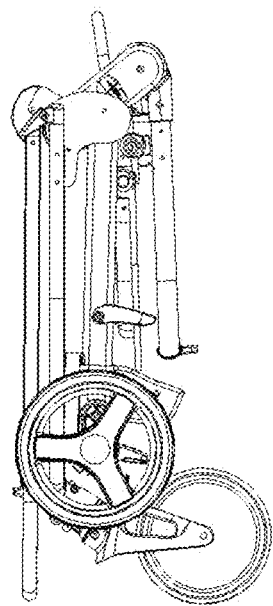
FIG. 20 is a schematic view wherein the reversing seat is inserted into the reversing seat mount toward the front tube to fold the frame according to an embodiment of the present disclosure.
Figure 21:
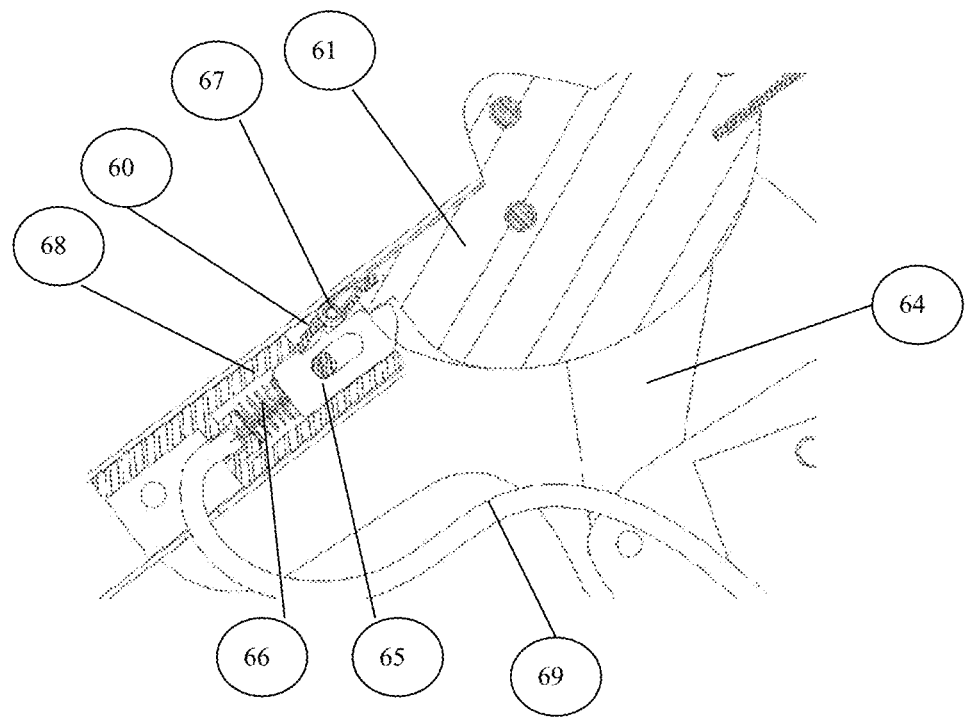
FIG. 21 is a partial sectional schematic view illustrating the locking pin, an elastic element, the locking pin blocker, a front tube plug and the fraction piece according to an embodiment of the present disclosure.

As shown in FIG. 17, after the reversing seat is inserted into the reversing seat mount toward the front tube, the frame is folded, and the mount support connecting rod drives the mount support base to rotate, so that the reversing seat mount moves away from the support point of the front tube and enters a movable state, and after a backrest of the reversing seat is turned forwards, the gravity center of the reversing seat is shifted forwards, so that the movable reversing seat mount rotates forwards.

As shown in the figure, after the reversing seat is inserted into the reversing seat mount toward the front tube, the frame is folded, and the mount support connecting rod drives the mount support base to rotate. Because the positioning hole of the mount support base drives the positioning post of the reversing seat clamping pin into motion, the reversing seat mount rotates toward the rear tube along with the reversing seat support base, so the backrest of the reversing seat approaches the rear tube after turning backwards and being folded.

According to an embodiment of the present disclosure, the handgrip 1, the front tube 2 and the rear tube 3 are all made of steel or aluminum alloy, wherein the handgrip 1, the front tube 2 and the rear tube 3 are each formed by bending an integrally formed pipe.

The terms "first", "second", etc. in the present disclosure are only used for differentiation in description, without special meanings.

The terms "upper end", "lower end", "front", "rear", etc. in the present disclosure are descriptive words corresponding to orientation of the accompanying drawings in the specification.

The stroller of the present disclosure represents an improvement in the art for at least the reason that it prevents children and adult users from nipping or shearing their hands during folding and unfolding of the frame.

Finally it should be noted that the above embodiments are only intended for illustrating instead of limiting the technical solution of the present disclosure. Although the present disclosure is described in detail with reference to some embodiments, a person of ordinary skill in the art should understand that specific implementations of the present disclosure can be modified or some technical features can be substituted equivalently and such modifications and substitutions should also be covered by the scope of the technical solution claimed by the present disclosure.

What is claimed is:
1. A folding stroller having a frame that can be arranged in at least a first configuration and a second configuration, the frame comprising:
 a handgrip fixedly connected to an upper joint;
 a lower joint pivotally connected to the upper joint, the lower joint being fixedly connected to a front tube;
 a rear joint pivotally connected to the lower joint, the rear joint being fixedly connected to a rear tube;

a joint connecting rod connected to the lower joint, the rear joint, and the upper joint;

wherein a distance between the upper joint and the rear joint is larger than a safety gap threshold that avoids nipping or shearing a user's hands while the frame is in the first configuration, while the frame is in the second configuration, and while the frame is transitioning between the first configuration and the second configuration;

wherein the first configuration is a folded configuration and the second configuration is an unfolded configuration, the stroller further comprising a frame locking mechanism, the frame locking mechanism comprising:
a front tube plug arranged in the front tube;
a guide slot along the front tube plug;
a locking pin arranged in the guide slot
a first elastic element arranged between the guide slot and the locking pin; and
a traction piece affixed to the locking pin, the traction piece passing through a through hole arranged at a bottom part of the guide slot and the rear tube;
wherein while the frame is transitioning from the first configuration to the second configuration, a blocking part attached to the frame locking mechanism can contact the locking pin, compress the first elastic element, and lift up a portion of the locking pin.

2. The folding stroller of claim 1, wherein:
the upper joint comprises a first pivot point and a second pivot point;
the rear joint comprises a third pivot point and a fourth pivot point;
the lower joint comprises a fifth pivot point and a sixth pivot point;
a first pivot shaft passes through the fifth pivot point and the first pivot point;
a second pivot shaft passes through the sixth pivot point and the fourth pivot point;
the upper joint is configured to rotate about the first pivot shaft; and
the rear joint is configured to rotate about the second pivot shaft.

3. The folding stroller of claim 1 wherein the upper joint, the rear joint, and the lower joint all have arc-shaped edges.

4. The folding stroller of claim 3 wherein the upper joint comprises an arc-shaped blocking component, the arc-shaped blocking component having a larger width than the arc-shaped edge of the lower joint, wherein during rotation of the upper joint toward the rear tube about the first pivot shaft, the arc-shaped edge of the lower joint is in contact with the arc-shaped blocking component.

5. The folding stroller of claim 1 wherein while the frame is transitioning from the second configuration to the first configuration, the traction piece is able to compress the first elastic element causing the locking pin to retract into the guide slot and the blocking part to enter an escape groove.

6. The folding stroller of claim 1 wherein the upper joint, the rear joint, and the lower joint each comprise plastic.

7. A folding stroller having a frame, the frame being foldable between a folded configuration and an unfolded configuration, the frame comprising:
a handgrip, a front tube, a rear tube and a joint assembly, the joint assembly comprising an upper joint, a rear joint, a lower joint and a joint connecting rod; an upper end of the upper joint being fixedly connected with the handgrip, and the upper joint being provided with a first pivot point and a second pivot point;
a lower end of the rear joint being fixedly connected with the rear tube, and the rear joint being provided with a third pivot point and a fourth pivot point;
the lower joint being fixedly connected with the front tube, and the lower joint being provided with a fifth pivot point and a sixth pivot point;
a first pivot shaft passing through the fifth pivot point and the first pivot point, the first pivot shaft pivotally connecting the lower joint with the upper joint;
a second pivot shaft passing through the sixth pivot point and the fourth pivot point, the second pivot shaft pivotally connecting the lower joint with the rear joint;
wherein opposite ends of the joint connecting rod are configured to be pivoted on the second pivot point and the third pivot point respectively,
wherein, while the frame transitions between the folded configuration and unfolded configuration, the handgrip causes the upper joint to rotate about the first pivot shaft, and the joint connecting rod is able to cause the rear joint and the rear tube to rotate about the second pivot shaft causing the rear tube to approach or move away from the front tube.

8. The folding stroller according to claim 7, wherein a distance between the upper joint and the rear joint is larger than a safety gap threshold that avoids nipping or shearing a user's hands while the frame is in a configuration wherein:
the first pivot shaft passes through the fifth pivot point and the first pivot point, and the opposite ends of the joint connecting rod are pivoted on the second pivot point and on the third pivot point respectively, and the second pivot shaft passes through the sixth pivot point and the fourth pivot point.

9. The folding stroller according to claim 8, wherein the joint connecting rod is arranged between the lower joint and the upper joint, and is in contact with the lower joint and the upper joint respectively, and wherein the lower joint, the upper joint and the rear joint all have arc-shaped edges.

10. The folding stroller according to claim 9, wherein a lower part of the upper joint is arc-shaped, and an arc-shaped blocking component is arranged at the lower part of the upper joint, the width of the arc-shaped blocking component being larger than that of the arc-shaped edge of the lower joint, wherein during rotation of the upper joint toward the rear tube about the first pivot shaft, the surface of the arc-shaped edge of the lower joint is able to contact the surface of the arc-shaped blocking component, thereby restricting the handgrip in a set position.

11. The folding stroller according to claim 7, wherein the folding stroller comprises a frame locking mechanism, and the frame locking mechanism comprises:
a locking block pin, a first elastic element, a second elastic element, a front tube plug, a traction piece, an unlocking pedal and a locking pin blocker;
the front tube plug is arranged in the front tube, and is arranged opposite to a lower end of the upper joint;
a guide slot is arranged at an upper part of the front tube plug, and the locking pin is arranged in the guide slot, and the first elastic element is arranged between a bottom of the guide slot and the locking pin;
a lower end of the locking pin is fixedly connected with one end of the traction piece, and the other end of the traction piece passes through a through hole arranged at the bottom of the guide slot and the rear tube, and is fixedly connected with the unlocking pedal which is pivoted on the rear tube;
a notch is arranged at an upper end of the front tube plug, and the locking pin blocker is mounted in the notch;

an upper end of the locking pin blocker is arranged opposite to the lower end of the upper joint, and a projecting first blocking part is arranged at the lower end of the upper joint; a middle segment of the locking pin blocker and the second elastic element are movably pivoted on the front tube plug by a third pivot shaft, and one end of the second elastic element is fixedly connected with the locking pin blocker;

a projecting block portion is arranged at an upper part of the middle segment of the locking pin, and a first escape groove and a second escape groove are arranged on opposite sides of the projecting block portion respectively, wherein the second escape groove is closer to the first elastic piece than the first escape groove;

an upper end of the locking pin is an arc-shaped bevel, and is provided with a second blocking part matched with the first blocking part;

wherein during unfolding of the frame, the first blocking part is in contact with the arc-shaped bevel at the upper end of the locking pin, and compresses the first elastic piece; after the first blocking part passes the arc-shaped bevel at the upper end of the locking pin, the first blocking part lifts up the upper end of the locking pin blocker, and the locking pin blocker overcomes elastic force of the second elastic element and rotates about the third pivot shaft, and a lower end of the locking pin blocker approaches the lower end of the locking pin.

12. The folding stroller according to claim 11, wherein:
when the frame is in the unfolded configuration, the locking pin projects out under elastic action caused by the first elastic piece, and the locking pin clamps the first blocking part between the upper end of the locking pin blocker and the second blocking part, and the lower end of the locking pin blocker is located in the second escape groove; and while the frame transitions from the unfolded configuration to the folded configuration, the traction piece is pulled to compress the first elastic piece, causing the locking pin to retract into the guide slot;

after being pulled and overcoming frictional resistance between the projecting block portion of the locking pin and the lower end of the locking pin blocker, the lower end of the locking pin blocker falls into the first escape groove, and the projecting block portion is blocked by the lower end of the locking pin blocker to restrict the locking pin from projecting out, permitting the upper joint to rotate; and wherein the upper joint is rotated to release blocking of the locking pin blocker, and the locking pin blocker rotates about the third pivot shaft under the elastic action of the second elastic element, causing the lower end of the locking pin blocker to move away from the projecting block portion, and the locking pin is released and springs out under the action of the first elastic element.

13. The folding stroller according to claim 12, wherein a slotted hole is formed in the middle segment of the locking pin, and a fourth pivot shaft passes through the slotted hole and is fixedly connected with the front tube plug, wherein a retracting stroke of the locking pin is a length of the slotted hole.

14. The folding stroller according to claim 7, wherein the frame further comprises a seat support assembly including a reversing seat mount, a mount support base and a mount support connecting rod;
the reversing seat mount and the mount support base are able to pivot on the lower joint by a fifth pivot shaft, and the mount support base is arranged between the reversing seat mount and the lower joint;
the reversing seat mount and the mount support base are both rotatable about the fifth pivot shaft;
opposite ends of the mount support connecting rod are able to pivot on the mount support base and the rear tube respectively; and
a support part is arranged on a side surface of the reversing seat mount, and the support part is matched with a support point arranged on the front tube, wherein in a fully unfolded configuration of the frame, the support point supports the support part, thereby preventing rotation of the reversing seat mount; the mount support base is provided with a first positioning hole and a second positioning hole, and a clamping pin of a reversing seat is provided with a positioning post matched with the first positioning hole and the second positioning hole.

15. The folding stroller according to claim 14, wherein:
the second positioning hole is a closed positioning hole, and the first positioning hole is an open hole of which a side wall is open, and the open hole and the reversing seat mount are combined to form a closed positioning hole;
in the configuration where the reversing seat is inserted into the reversing seat mount and the positioning post is clamped into the second positioning hole, during folding of the frame, the rear tube drives the mount support base by means of the mount support connecting rod to rotate about the sixth pivot point with the lower joint, and the second positioning hole locks the positioning post, causing the clamping pin of the reversing seat to turn in the direction of the rear tube along with the mount support base;
in the configuration where the reversing seat is inserted into the reversing seat mount, and the positioning post is clamped into the first positioning hole, during folding of the frame, the rear tube approaches the front tube, and the rear tube drives the mount support base by means of the mount support connecting rod to rotate about the sixth pivot point with the lower joint, causing the mount support base to drive the reversing seat mount to rotate toward the rear tube, thereby causing the support point of the front tube to move away from the support part of the reversing seat mount, and the reversing seat mount is movable relative to the reversing seat, which automatically approaches the front tube due to its own weight.

16. The folding stroller according to claim 7, wherein the upper joint, the rear joint, and the lower joint comprise plastic, steel or an aluminum alloy.

17. The folding stroller according to claim 7, wherein the handgrip, the front tube and the rear tube each comprises an integrally formed pipe.

* * * * *